United States Patent Office 3,376,260
Patented Apr. 2, 1968

3,376,260
PROCESS FOR PREPARING POLYIMIDES FROM DIAMINES AND DIANHYDRIDES IN THE PRESENCE OF A BASIC CATALYST
Charles Gerhard Fritz, Wilmington, Del., assignor to E. I. du Pont de Nemours and Company, Wilmington, Del., a corporation of Delaware
No Drawing. Filed Nov. 26, 1965, Ser. No. 510,056
10 Claims. (Cl. 260—47)

The present invention relates to an improved process for the production of coalescible polyimide powders.

In the past, it has been known to form aromatic polyimides by forming a polyamide acid from an aromatic tetracarboxylic anhydride and an aromatic diamine and then effecting ring closure of the polyamide acid to form a polyimide. Such processes for forming polyimides are described in United States Patent Numbers, 3,179,614 issued Apr. 20, 1965 to Walter Murray Edwards; 3,179,630 issued Apr. 20, 1965 to Andrew Laszo Endrey; 3,179,631 issued Apr. 20, 1965 to Andrew Laszo Endrey. These processes suffer the disadvantage that is necessary to form and maintain the aromatic tetracarboxylic dianhydrides in anhydrous condition until they are used which is a difficult problem. These dianhydrides are very hydroscopic and revert to the acid as they pick up water.

In carrying out the present invention, one first forms a diester of a tetracarboxylic acid. The aromatic diester diacid is then dissolved in a solvent along with from 95 to 105 molar percent, as based on the aromatic diester diacid of an aromatic diamine. Upon heating at from 100 to 200° C., the ester acid pairs eliminate an alkanol to form the corresponding aromatic anhydride which reacts rapidly with the diamine present to form amide acid groups which are, in turn, cyclized to form the corresponding imide groups. Ordinarily, this latter reaction takes place sufficiently fast to form insoluble products before extensive build up of molecular weight. The thus formed precipitated polyimide powder cannot be coalesced into good moldings. This is believed to be due to its low molecular weight. It has now been found that strongly basic catalysts can be used to catalyze the formation of the intermediate anhydride groups to an extent that high molecular weight polymer is formed before insolubility due to subsequent imide formation.

These catalysts include the alkoxides containing from 1 to 6 carbon atoms, the lower fatty acid salts containing up to 6 carbon atoms, carbonates, and hydroxides of the alkaline earth metals and the alkali metals. These catalysts should be soluble in the solvent being used such as N,N-dimethylacetamide substantially to the extent they are present. This is to facilitate its removal from the product as well as its availability to catalyze the reaction. Thus, similar compounds of other metals such as aluminum may be useful as long as they are in a sufficiently soluble form. The catalyst should be present in the range of from 2 to 60 mole percent and, preferably, from 5 to 40 mole percent as based on the diester diacid. While a larger amount of catalyst may be used, a solubility problem is often involved and the improvement in properties due to the associated increase in molecular weight generally is marginal. It is to be understood that these catalyst must be almost entirely removed since, if present, they may catalyze the decomposition of the polymers during the coalescing operation.

The solvents useful in the present solution polymerization process are the organic solvents whose functional groups do not react with the reactants to an extent greater than the reactants do with each other. Besides being inert to the system, the organic solvent should be a solvent for the aromatic diacid diesters, the anhydrides formed therefrom, the aromatic diamines and the resultant polyamide acids prior to extensive imidization. The normally liquid organic solvents of the N,N-dialkylcarboxylamide class are useful as solvents in the process of this invention. The preferred solvents are the lower molecular weight members of this class such as N,N-dimethylformamide, and N,N-dimethylacetamide. Other typical compounds of this useful class of solvents are: N,N-dimethylmethoxyacetamide, N,N-diethylformamide, N,N-diethylacetamide, and N-methylcaprolactam. Other solvents which may be used in the present invention are: dimethylsulfoxide, N-methyl-2-pyrrolidone, tetramethylurea, dimethylsulfone, hexamethylphosphoramide, tetramethylenesulfone, formamide, N-methylformamide, and N-acetyl-2-pyrrolidone. The solvents can be used alone or in combination.

The process of the present invention is applicable to aromatic polyimides formed of aromatic diester diacids and aromatic diamines or of aromatic ester acid amines. The aromatic diester diacids are generally the diester diacids corresponding to the dianhydrides described in U.S. Patent No. 3,179,630, and have the general structure

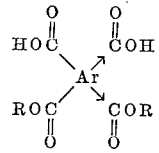

wherein→denotes isomerism and where Ar is an organic tetravalent radical containing at least six carbon atoms in a ring, said ring being characterized by benzenoid unsaturation, the four carbonyl groups being attached to separate carbon atoms and each pair of carbonyl groups, which consist of an acid and an ester group, being attached to adjacent carbon atoms in a 6-membered benzenoid ring of the Ar radical. Preferably, R is a lower alkyl having from 1 to 6 carbon atoms. Illustrative diester diacids are 1,4-dicarbethoxy-2,5-dicarboxybenzene, 1,5-dicarbomethoxy-2,4-dicarboxylbenzene, the diethyl esters of 2,3,6,7-naphthalene tetracarboxylic acid, the diisopropyl esters of 1,2,5,6-naphthalene tetracarboxylic acid, the diethyl esters of 2,2',3,3'-diphenyl tetracarboxylic acid, the diethyl esters of 2,2-bis(3,4-dicarboxyphenyl)propane, the diethyl esters of bis(3,4-dicarboxyphenyl)sulfone, the dimethyl esters of 1,1-bis(2,3-dicarboxyphenyl)ethane, the diethyl esters of bis(2,3-dicarboxyphenyl)methane, the diethyl esters of 3,4,3',4'-benzophenone tetracarboxylic acid, the dibutyl esters of bis(3,4-dicarboxyphenyl)ether, the diethyl ester of bis(3,4-dicarboxyphenyl)sulfide, etc.

The suitable aromatic diamines are characterized by the formula H₂N—Ar'—NH₂, wherein Ar', the divalent radical, is phenylene or biphenylene or a fused aromatic ring diradical such as that derived from naphthalene or anthracene, or bridged diradicals, which are aromatic rings bridged by oxygen, nitrogen, sulfur, silicon, phosphorus or carbon, and substituted groups thereof. The preferred Ar' groups in the diamines are those containing at least two rings, having 6 carbon atoms characterized by benzoid unsaturation in each ring. Such Ar' groups include

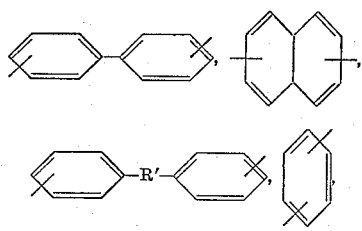

and

wherein —R'— is selected from the class consisting of oxygen,

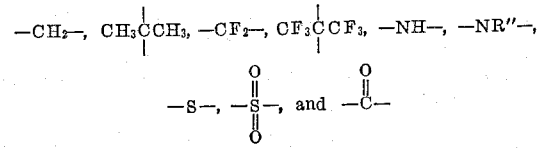

wherein R'' is selected from the class consisting of alkyl radicals containing from 1 to 6 carbon atoms and aryl radicals containing up to 12 carbon atoms. Among the diamines which are useful in the present invention are: 2,2-bis(4-aminophenyl)propane; 4,4'-diamino-diphenylmethane; 4,4'-diamino-diphenylamine; benzidine; 4,4'-diamino-diphenylsulfide; 4,4'-diaminodiphenylsulfone; 3,3'-diamino-diphenylsulfone; 4,4'-diamino-diphenylether; bis-(4-aminophenyl)phenyl phosphine oxide; bis(4-aminophenyl)-N-methylamine; 1,5-diamino-naphthalene; 3,3'-dimethyl-4,4'-diamino-biphenyl; 3,3'-dimethoxy-benzidine; 1,4-bis(p-aminophenoxy)benzene and mixtures thereof.

The present process is particularly well suited to the AB type of monomer. These monomers have the structure

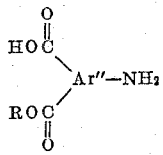

wherein R has the meaning previously described and wherein Ar'' is a trivalent cyclic or polycyclic aromatic radical in which the aromatic rings may be benzenoid or heterocyclic, and may be two such aromatic groups bridged by oxygen, nitrogen, sulfur, silicon, phosphorus, or carbon and substituted groups thereof or directly attached rings such as biphenylene. The preferred Ar'' groups are those containing 1 or more rings having 6 carbon atoms characterized by benzenoid unsaturation in each ring. The ester and the acid groups must be attached to adjacent carbon atoms. These preferred Ar'' groups include

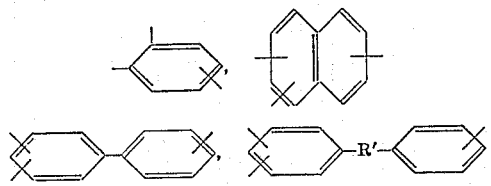

and

wherein R' has the meaning previously described. Suitable AB monomers include 4-amino-2-carbethoxy-benzoic acid, 4-amino-3'-carbethoxy-4'-carboxybenzophenone, and 4-amino-3'-carbethoxy-4'-carboxydiphenyl ether.

The polyimide particles are characterized by surface areas of 1 square meter/gram and preferably from 2 to 500 square meters/gram. The inherent viscosity of the polyimide should be at least 0.1 and preferably from 0.3 to 5. The inherent viscosity is measured at 35° C. as a 0.5 percent solution in a suitable solvent. The solvent can be selected from the group consisting of concentrated (96%) sulfuric acid, fuming nitric acid, the monohydrate of dichlorotetrafluoroacetone, and the monohydrate of monochloropentafluoroacetone. If the polyimide is not soluble in any of these solvents to the extent of 0.5 percent, and if particles of the polyimide can be formed into a shaped article having a tensile strength of above 3,000 p.s.i., then its inherent viscosity may be considered to be greater than 0.1.

The finely divided, high surface area polyimides prepared according to this invention can be made to coalesce at temperatures below the crystalline melting point into solid, homogeneous objects under the influence of heat and pressure. The coalescing process requires the application of a pressure of from 3,000 to about 100,000 p.s.i. to the particulate polyimide with concurrent or subsequent heating to a temperature of from 200 to about 500° C., but below the crystalline melting point of the polyimide. Fabrication by coalescence of disks 1.25 inches in diameter and about 0.085 inch in thickness provides convenient pieces for testing since the problems of reproducibility of fabrications are reduced to a minimum. These test samples are fabricated and their tensile strengths ascertained by slicing a 3/8 inch wide strip from near the center of the disk, reducing the center width of the strip to 1/8 inch by removing a semicircular section of 1 inch diameter from each side and mounting the resulting sample in the jaws of an "Instron" testing machine and separating the jaws at a rate of 0.2 inch per minute, recording the break strength, and converting the strength figure obtained to p.s.i.

The following examples are illustrative of the invention.

Example I

A suspension of 6.014 g. (0.0194 mole) diethyl pyromellitate, 3.880 g. (0.0194 mole) 4,4'-diaminodiphenyl ether and 0.105 g. (0.00194 mole) of sodium methoxide in 60 ml. of dry dimethylacetamide is stirred until a clear solution is obtained. The solution is then brought to a boil and refluxed for 25 minutes. The solid precipitate is then filtered off, washed carefully with acetone, methanol and water and dried. After heat treatment (325°/16 hrs.) an 84.6 percent yield of yellow polyimide powder is obtained. A chip prepared from this material has a tensile strength of 16,340 p.s.i. at a 4.2 percent elongation.

Very similar results are obtained when the catalyst concentration is varied from 2 to 60 mole percent.

Example II

A solution of 0.01 mole of an isomer mixture of the diethyl esters of 3,3',4,4'-benzophenonetetracarboxylic acid made by reacting 3,3',4,4'-benzophenonetetracarboxylic dianhydride with ethanol, 0.01 mole of 4,4'-diaminodiphenyl ether and 0.002 mole of sodium methoxide in 60 ml. of dry dimethylacetamide is heated to reflux. After heating for 60 minutes, precipitation finally starts. Total reflux time before the filtration of the product is 105 minutes. After thorough washing, the product is air dried and then heat treated. The yellow product is obtained in 54.2 percent yield. A chip prepared from this material has a tensile strength of 22,770 p.s.i. at 4.5 percent elongation.

Example III

A solution of 6.216 g. (0.015 mole) of the diethyl esters of 3,3',4,4'-benzophenonetetracarboxylic acid prepared as in Example II, 1.618 g. (0.015 mole) of m-phenylene diamine and 0.17 g. (0.003 mole) of sodium methoxide, in 80 ml. of dimethylacetamide is refluxed for 70 min. and the product filtered off. After careful washing and heat treatment, 1.5 g. of a polyimide is obtained. A chip is obtained which has a tensile strength of 10,400 p.s.i. at an elongation of 1.33 percent.

Example IV

A 100 ml. three-necked round bottom flask, equipped with a mechanical stirrer and a reflux condenser is charged with 12 g. of 4-amino-3'-carbethoxy-4'-carboxybenzophenone, 0.05 g. of sodium methoxide and 20 ml. of dimethylacetamide. The homogeneous solution is then brought to reflux and the application of heat continued for 2 hours.

After this period, the yellow polymeric precipitate is filtered off and thoroughly washed with methanol, water, and acetone. After drying and heat treatment, the yellow powder had an I.R. spectrum corresponding to a polyimide. A molding is made at 400° C. and 15,000 p.s.i.

Example V

A solution of 0.02 mole of diethyl pyromellitate, 0.02 mole of 4,4'-diaminodiphenyl ether and 0.0036 mole of sodium acetate in 60 ml. of dimethylacetamide is heated to reflux for twenty minutes. Precipitation commences one minute after reflux temperature is reached. After thorough washing with alternating cycles of water and acetone, the product is air dried and heat treated. The product is obtained in 78.2 percent yield. A chip prepared from this material has a tensile strength of 14,550 p.s.i. at 3.4 percent elongation.

Example VI

A solution of 0.02 mole of diethyl pyromellitate, 0.02 mole of 4,4'-diaminodiphenyl ether, and 0.002 mole of sodium carbonate in 60 ml. of dimethylacetamide is refluxed for 31 minutes. Precipitation commences six minutes after reflux temperature is reached. After thorough washing twice with acetone, twice with methyl alcohol, twice with water, and twice more with acetone in that order, the product is dried and heat treated. The product is obtained in 82.7 percent yield. A chip prepared from this material has a tensile strength of 14,760 p.s.i. at 3.2 percent elongation.

Example VII

A solution of 0.019 mole of diethyl pyromellitate, 0.019 mole of 4,4'-diaminodiphenyl ether and 0.0038 mole of sodium hydroxide in 60 ml. of dimethylacetamide is refluxed for 30 minutes. Precipitation commences 5 minutes after reflux temperature is reached. After thorough washing twice with acetone, twice with methyl alcohol, twice with water, and twice more with acetone, in that order, the product is dried and heat treated. The product is obtained in 80.1 percent yield. A chip prepared from this material has a tensile strength of 8,840 p.s.i. at 1.7 percent elongation.

The polyimides formed by the present invention are useful in forming high temperature, high strength parts such as bearings, seals, molds, and piston rings. This process may be carried out in the presence of a filler which fillers are added to the reaction mixture before precipitation occurs. Such fillers include graphite, silicon carbide, alundum, finely divided metals, other high temperature resins such as polytetrafluoroethylene, glasses, etc., to produce articles for special uses such as grinding wheels, bearings, etc.

I claim:

1. A process for preparing polyimides wherein materials selected from the class consisting of an aromatic diamine together with an aromatic diester diacid, in which all amino, ester and acid groups are directly attached to aromatic rings and in which one acid and one ester group form a pair attached to adjacent carbon atoms, are reacted at from 100 to 200° C. in solution and in the presence of from 1 to 30 mole percent, as calculated on the acid groups, of a base selected from the class consisting of alkoxides containing from 1 to 6 carbon atoms; salts of lower fatty acids containing from 1 to 6 carbon atoms; carbonates; and hydroxides; of the alkaline earth metals and alkali metals, to form an anhydride which in turn reacts with the amine present to form a polyamide acid which cyclizes at from 100 to 200° C. to form a precipitate of polyimide in the form of a powder having a surface area of at least 1 square meter per gram.

2. The process of claim 1 wherein the diamine has the structure $H_2N-Ar'-NH_2$, wherein Ar' is a divalent radical selected from the class consisting of phenylene, biphenylene, naphthalene and bridged phenylene radicals.

3. The process of claim 2 wherein the diester diacid has the structure

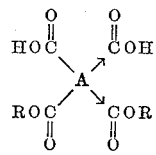

wherein → denotes isomerism, and wherein Ar is a tetravalent organic radical containing at least 6 carbon atoms in a ring, said ring being characterized by benzenoid unsaturation, the 4 carbonyl groups being attached to separate carbon atoms and each pair of carbonyl groups being attached to adjacent carbon atoms in a 6-membered benzenoid radical, and R is a lower alkyl radical having 1 to 6 carbon atoms.

4. The process of claim 3 wherein the basic catalyst is present in an amount of from 2.5 to 20 mole percent as based on the acid groups present.

5. The process of claim 4 wherein the surface area of the precipitated polyimide particles is from 2 to 500 square meters per gram.

6. The process of claim 5 wherein the diester diacid is diethyl pyromellitate.

7. The process of claim 5 wherein the diester diacid is diethyl-3,3',4,4',benzophenone tetracarboxylate.

8. The process of claim 6 wherein the diamine is 4,4'-diaminodiphenyl ether.

9. The process of claim 7 wherein the diamine is 4,4'-diaminodiphenyl ether.

10. The process of claim 7 wherein the diamine is m-phenylene diamine.

No references cited.

WILLIAM H. SHORT, *Primary Examiner.*

L. LEE, *Assistant Examiner.*

UNITED STATES PATENT OFFICE
CERTIFICATE OF CORRECTION

Patent No. 3,376,260                                                  April 2, 1968

Charles Gerhard Fritz

It is hereby certified that error appears in the above numbered patent requiring correction and that the said Letters Patent should read as corrected below.

Column 1, line 63, "catalyst" should read -- catalysts --. Column 6, line 15, "$H_2N-Ar'-SH_2$" should read -- $H_2N-Ar'-NH_2$ --; lines 23 and 24, that portion of the formula reading

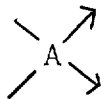             should read             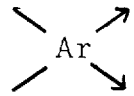

Signed and sealed this 23rd day of September 1969.

(SEAL)
Attest:

EDWARD M. FLETCHER, JR.                        WILLIAM E. SCHUYLER, JR.
Attesting Officer                                    Commissioner of Patents